US008818928B2

(12) United States Patent
Kast et al.

(10) Patent No.: US 8,818,928 B2
(45) Date of Patent: Aug. 26, 2014

(54) EVALUATING AN ITEM BASED ON USER REPUTATION INFORMATION

(71) Applicant: LinkedIn Corporation, Mountain View, CA (US)

(72) Inventors: Anton P. Kast, San Francisco, CA (US); Wesley Grant Augur, New York, NY (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/864,974

(22) Filed: Apr. 17, 2013

(65) Prior Publication Data
US 2013/0238633 A1 Sep. 12, 2013

Related U.S. Application Data

(63) Continuation of application No. 12/790,878, filed on May 31, 2010, and a continuation-in-part of application No. 12/229,528, filed on Aug. 22, 2008.

(60) Provisional application No. 61/182,750, filed on May 31, 2009, provisional application No. 60/965,850, filed on Aug. 22, 2007, provisional application No. 60/967,910, filed on Sep. 6, 2007.

(51) Int. Cl.
*G06N 5/04* (2006.01)
*G06F 17/30* (2006.01)

(52) U.S. Cl.
CPC .... *G06F 17/30283* (2013.01); *G06F 17/30041* (2013.01); *G06F 17/30873* (2013.01); *G06N 5/04* (2013.01); *G06F 17/30867* (2013.01); *G06F 17/30958* (2013.01); *G06F 17/30699* (2013.01)
USPC .......................................................... 706/47

(58) Field of Classification Search
USPC .......................................................... 706/47
See application file for complete search history.

(56) References Cited

PUBLICATIONS

Alshabib et al ("Deriving Ratings Through Social Network Structures" ARES'06, Apr. 20, 2006).*
Annie Chen ("Context-Aware Collaborative Filtering System: Predicting the User's Preference in the Ubiquitous Computing Environment" 2006).*
Weth et al ("A Unifying Framework for Behavior-Based Trust Models" 2006).*
Hameeda Alshabib et al.: "Deriving Ratings Through Social Network Structures", Proceedings of the First International Conference on Availability, Reliability and Security, 0-7695-2567-9/6, IEEE 2006.
Christian von der Weth et al.: "A Unifying Framework for Behavior-Based Trust Models", OTM 2006, LNCS 4275, pp. 444-461, Springer-Verlag Berlin Heidelberg, 2006.
Annie Chen: "Context-Aware Collaborative Filtering System: Predicting the User'S Preference in the Ubiquitous Comlputing Environment", LoCA 2005, LNCS 3479, pp. 244-253, Springer-Verlag Berlin Heidelberg, 2005.

* cited by examiner

*Primary Examiner* — Lut Wong
(74) *Attorney, Agent, or Firm* — Park, Vaughan, Fleming & Dowler LLP

(57) ABSTRACT

Evaluating an item based on user reputation information is disclosed. Sharing event data is received. A graph is materialized from the received sharing event data. User reputation scores are determined based at least in part on the graph. A score is assigned to the item based at least in part on the user reputation scores of users associated with the item.

17 Claims, 17 Drawing Sheets

FIG. 5

Café Le French — 802

| 15 diggs |  submitted by David 7 hours 26 minutes ago (via http://www.cafelefrench.com/menu) |
|---|---|
| digg it | Delicious tasting menu changes weekly. Menu focuses on seasonal ingredients. Can be very crowded at lunch. More... |

Cuisine: French Bistro
TAGS: souflée— 808 — 804
Location: California >> San Francisco >> South of Market
 21 Comments  Problem? ▼

\ 806

EVALUATING AN ITEM BASED ON USER REPUTATION INFORMATION

CROSS REFERENCE TO OTHER APPLICATIONS

This application is a continuation of co-pending U.S. patent application Ser. No. 12/790,878 (the '878 application), which was filed May 31, 2010 and is entitled "Evaluating an Item Based on User Reputation Information," and which claims priority to U.S. Provisional Patent Application No. 61/182,750, filed May 31, 2009 and entitled "Connecting Users and Activities." The '878 application is a continuation-in-part of co-pending U.S. patent application Ser. No. 12/229,528 (the '528 application), which was filed Aug. 22, 2008 and is entitled "Promoting Content." The '528 application claims priority to U.S. Provisional Patent Application No. 60/965,850, filed Aug. 22, 2007 and entitled "Finding and Using Content Predictors," and U.S. Provisional Patent Application No. 60/967,910, filed Sep. 6, 2007and entitled "Detecting Associates and Automatically Adapting Thresholds." All of the foregoing U.S. Patent Applications and U.S. Provisional Patent Applications are incorporated herein by reference for all purposes. Also, this application is related to co-pending U.S. patent application Ser. No. 13/864,982, filed 17 Apr. 2013 herewith and also entitled "Evaluating an Item Based on User Reputation Information."

BACKGROUND OF THE INVENTION

Content repositories, voting sites, and other social collaborative networks, such as public photograph, journal and video sites, typically contain a vast amount of content. One problem with such sites is that it can be difficult for users to locate desirable or interesting content among other, less interesting content. The problem can be exacerbated if such sites accept user-submitted content. Unscrupulous individuals may attempt to leverage the popularity of the site for financial gain, such as by directing traffic to advertising and other self-promotional material (e.g., spamming). Similarly, well-intentioned visitors may inadvertently clutter the portal, such as with duplicate content. In both cases, legitimate content is made all the more difficult to locate.

BRIEF DESCRIPTION OF THE DRAWINGS

Various embodiments of the invention are disclosed in the following detailed description and the accompanying drawings.

FIG. 5 illustrates an embodiment of an interface to a preference system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
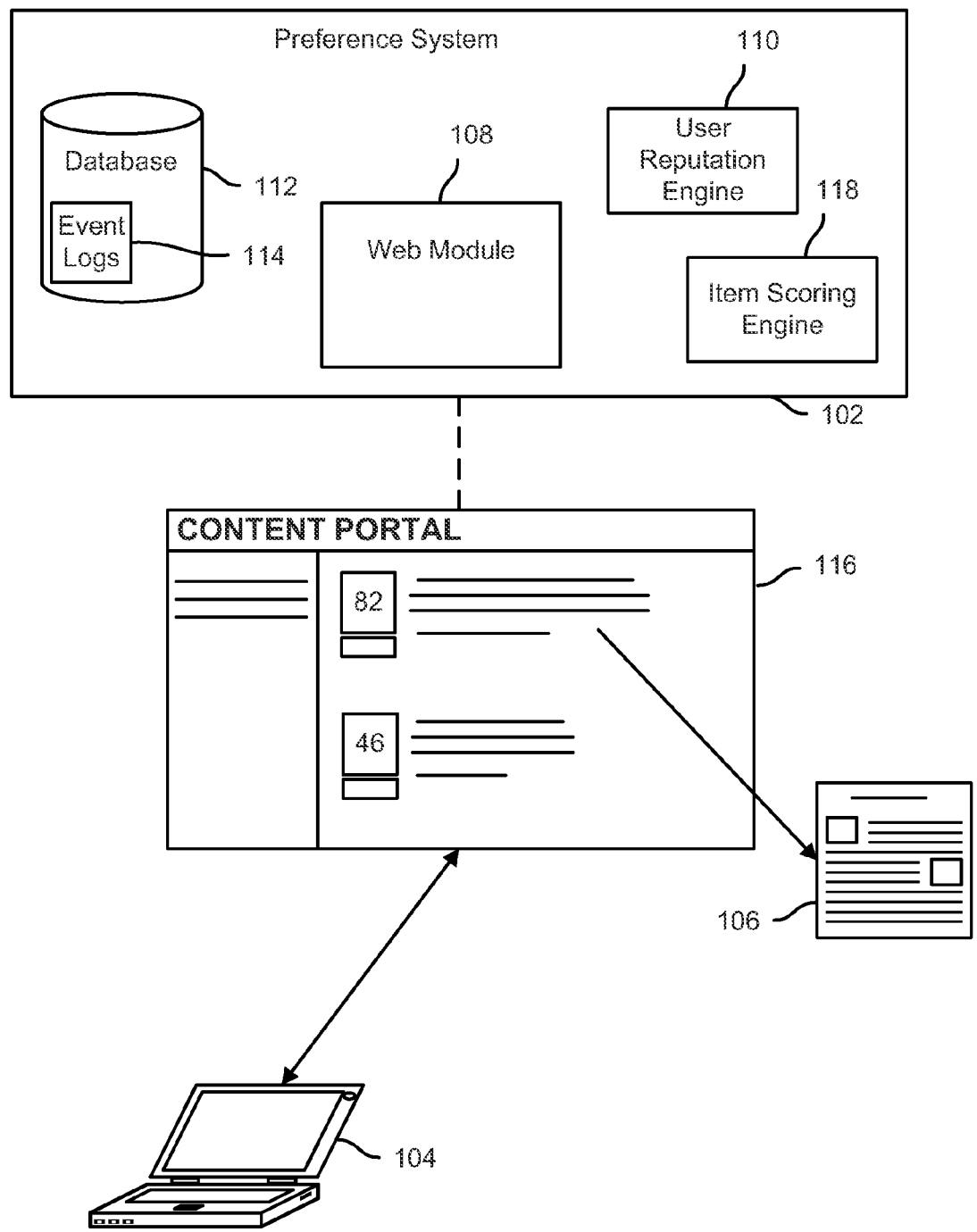
FIG. 1 illustrates an embodiment of an environment in which user reputations are determined and item evaluations are made.

FIG. 1 illustrates an embodiment of an environment in which user reputations are determined and item evaluations are made. In the example shown, users (e.g., a user of client 104) indicate preferences for items via preference system 102. Examples of items include news articles, blog posts, products, services, various other web pages, podcasts, photographs, and videos published by various publishers. Examples of clients include personal computers, laptops, cellular phones/personal digital assistants, and other types of information appliances such as set-top boxes, game consoles, broadband routers, file servers, video servers, and digital video recorders, as applicable.

As will be described in more detail below, preference system 102 is configured to provide a link to content (e.g., a hyperlink to site 106) and summary information pertaining to that content, and also to allow users to indicate their preferences for the content (and other items) by making a variety of interactions. For example, users can provide quantitative feedback such as a "thumbs up" (also referred to herein as a "digg") to indicate their preference for an item and can also "bury" an item to indicate their preference against that item for various reasons. Users can also discuss items with one another. These actions are referred to herein collectively as "preference events." In various embodiments, publishers register items with system 102. Users can also register items with system 102 by providing a uniform resource locator (URL) of the item. In such scenario, the user's registration (also referred to herein as a "submission") of the item is another example of a preference event.

When an item is submitted to system 102, an entry for the item is created in database 112. Information such as the submission time and the user who submitted the item are stored and counts associated with the item are initialized. Additionally, information associated with the submitting user is modified as appropriate. For example, a count of the number of items submitted by the user is incremented and the item is made available in areas such as the user's profile and the profile areas of the user's friends (described in more detail below), if applicable.

Preference system 102 includes a web module 108 that provides typical web server functionality such as serving website 116 and capturing user input. In the example shown, web module 108 is an Apache HTTP server that supports running PHP scripts. In various embodiments, the functionality of website 116 is exposed to users via one or more APIs, as applicable. Web module 108 is interfaced with a database 112, such as through a MySQL database backend. Whenever a preference event occurs (e.g., whenever a user submits, diggs, buries, or comments on an item), the event is recorded in database 112 along with associated information such as the identity of the user and a time/date stamp.

Also shown in FIG. 1 is a user reputation engine 110, which is configured to assign reputation scores to users of system 102. As will be described in more detail below, user reputation engine 110 evaluates event log information, such as is stored in database 112 in some embodiments. Also as will be described in more detail below, user reputation scores are used by item scoring engine 118 to assign scores to items. In various embodiments, item scoring engine 118 is configured to make determinations such as what content should appear in various sections of website 116. For example, content that appears to be popular may be "promoted" by item scoring engine 118 by being displayed in a prominent location on the main page of website 116 for some period of time.

In some embodiments, the infrastructure provided by portions of preference system 102 is located on and/or replicated across a plurality of servers rather than the entirety of preference system 102 being collocated on a single platform. Such may be the case, for example, if the contents of database 112 are vast and/or there are many simultaneous visitors to site 116. Whenever system 102 performs a task, a single component, a subset of components, or all components of system 102 may cooperate to perform the task. Similarly, in some embodiments, portions of system 102 are provided by one or more third parties.

In the example shown, user reputation engine 110 and item scoring engine 118 are incorporated into system 102. These engines can also be physically separate from system 102, but operated by the operator of system 102. In various embodiments, one or both of the engines are controlled by a party that is separate from the operator of preference system 102 (or, the engines are implemented using hardware owned by a third party, such as Amazon EC2). In those scenarios, the engine(s) can be configured to obtain any necessary information from system 102 (e.g., pertaining to preference events) via an API or via scraping techniques, as applicable. User reputation engine 110 and item scoring engine 11 can also be configured to provide their respective scoring functions using data sources other than system 102, as applicable.

Figure 2:
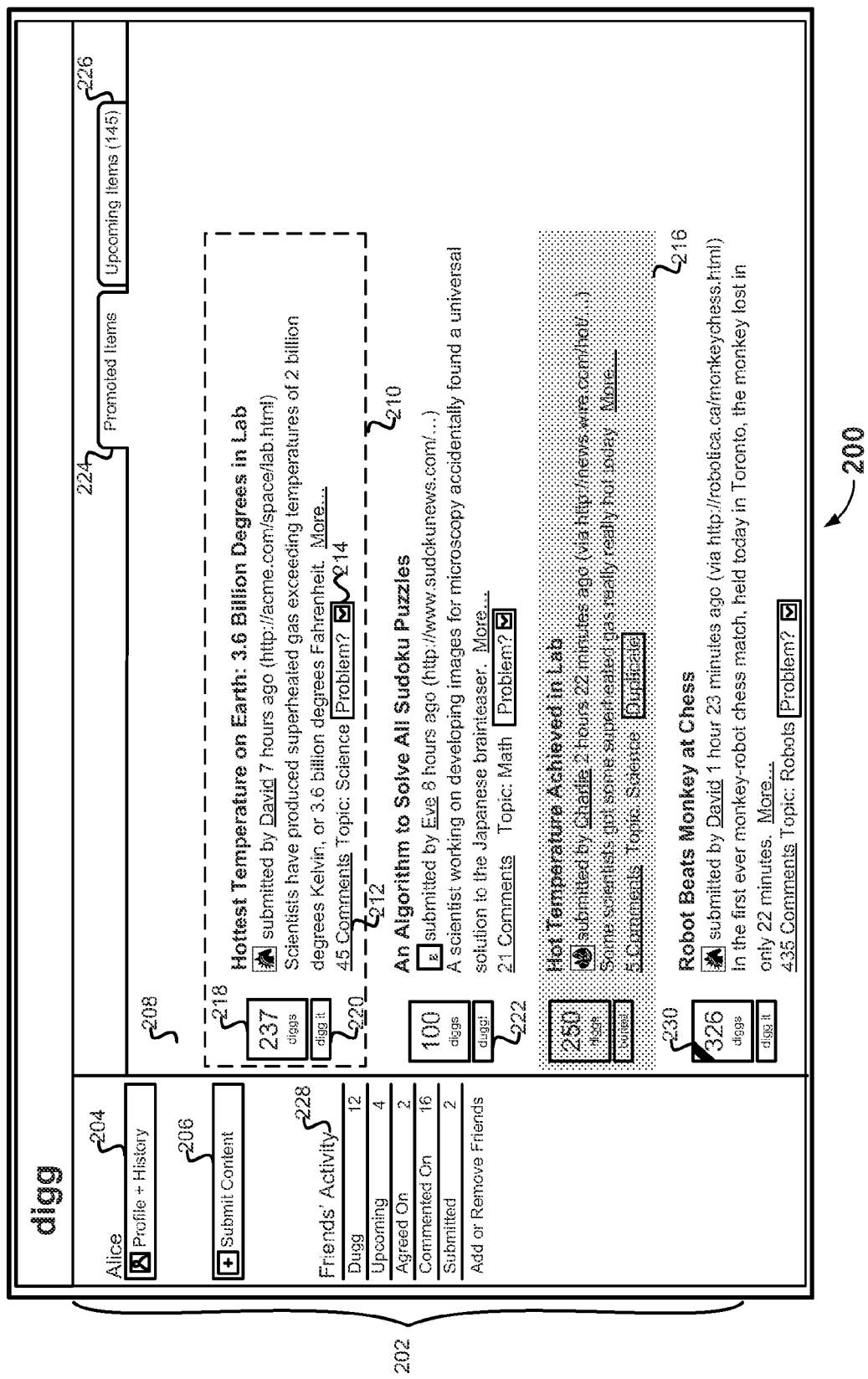
FIG. 2 illustrates an embodiment of an interface to a preference system.

FIG. 2 illustrates an embodiment of an interface to a preference system. The example shown is an implementation of a portion of website 116, as rendered in a browser. A user, known as "Alice" is logged into site 116. Interface 200 includes a sidebar 202 that provides access to various system services. For example, by selecting region 204 of sidebar 202, Alice is presented with an interface that permits her to view her profile and manage account settings, such as her current email address and password; view previous preference events she's taken (her "history"); and access friend-related features described in more detail below. By selecting region 206, Alice will be presented with an interface through which she can submit content for inclusion on system 102.

Region 208 displays representations of multiple content entries such as entry 210. In the example shown, each entry includes a title and other associated information, such as who submitted the content and when, the external URL of the content, the category to which the content belongs, and a summary of the content. Links are provided to the content directly (such as by clicking on the title), as well as to an area of site 116 associated with each specific item, referred to herein as the item's "permalink." For example, by clicking on the comments link (212) of the story, Alice will be presented with the comments portion of the permalink described in more detail below.

Content entry 210 also includes a problem reporting region 214. Users may report problems for a variety of reasons. For example, the first content entry and the third content entry are both news articles describing the same news—scientists superheating a gas. Accordingly, Alice selects the problem, "duplicate" content, which has the effect in this embodiment of graying out the content, represented here by stippling (216).

Each content entry has one or more scores associated with it. In the example shown, the "digg" score (218) for each item is displayed, as is an interactive region beneath the score (box 220) that allows a user to "digg" the item. The first item has been dugg 237 times, but has not been dugg by Alice. As described in more detail below, if Alice were to select region 218, a variety of actions would be immediately taken, including increasing the digg score of the story and updating the region's text from "digg it" to "dugg!" as shown in region 222.

Alice is currently viewing a "promoted items" (224) view of region 208. This means that all of the items presented to Alice on the current view of the interface have exceeded a promotion threshold. One example of a promotion threshold is the raw number of diggs. Other requirements/factors may be used for thresholding in addition to or instead of a digg score, such as requiring that a certain amount of time elapse between content submission and promotion, the speed with which content is being dugg by others, the identity of those digging the content, and other information associated with users that have dugg the content. Because some threshold of users must agree that an item has merit before being promoted, items shown in promoted view 224 are unlikely to contain spam or otherwise be inherently inappropriate for Alice's viewing. In some embodiments, different thresholds are used for different content. For example, the promotion of a math related news article may only require 100 diggs whereas an article about the president may require 500 diggs.

If Alice selects the upcoming content tab (226), only content which has not yet met the appropriate threshold will be displayed. For example, newly submitted content which has not yet been "dugg" by a sufficient number of people will be presented by selecting tab 226. In some embodiments, if content languishes in the upcoming pool for more than a certain period of time without receiving a sufficient digg score to be promoted (e.g., for a week), the content is removed from the pool and can only be found via its permalink or through a search. In some embodiments, such content is deleted from database 112 because it is indicative of problematic content such as spam, extremely biased or unfounded news articles, etc. Similarly, if enough users bury content, the content may be removed from the pool and/or database 112. In other embodiments, other views of content may be presented as applicable, such as a view that unifies both the promoted and the upcoming groups.

Portion 228 of interface 200 displays the recent activities (preference events) of Alice's friends. For example, in the last 48 hours, Alice's friends have submitted two items, dugg twelve items, and commented on sixteen items, as reflected in dashboard 228. Of the twelve items her friends have dugg, four of the items have not yet been promoted. In some embodiments, assorted visual cues of her friends' activity are presented throughout website 116. In the example shown, items dugg by Alice's friends are notated by a banner (230) placed across the digg score. In other cases, other cues may be used.

Figure 3:
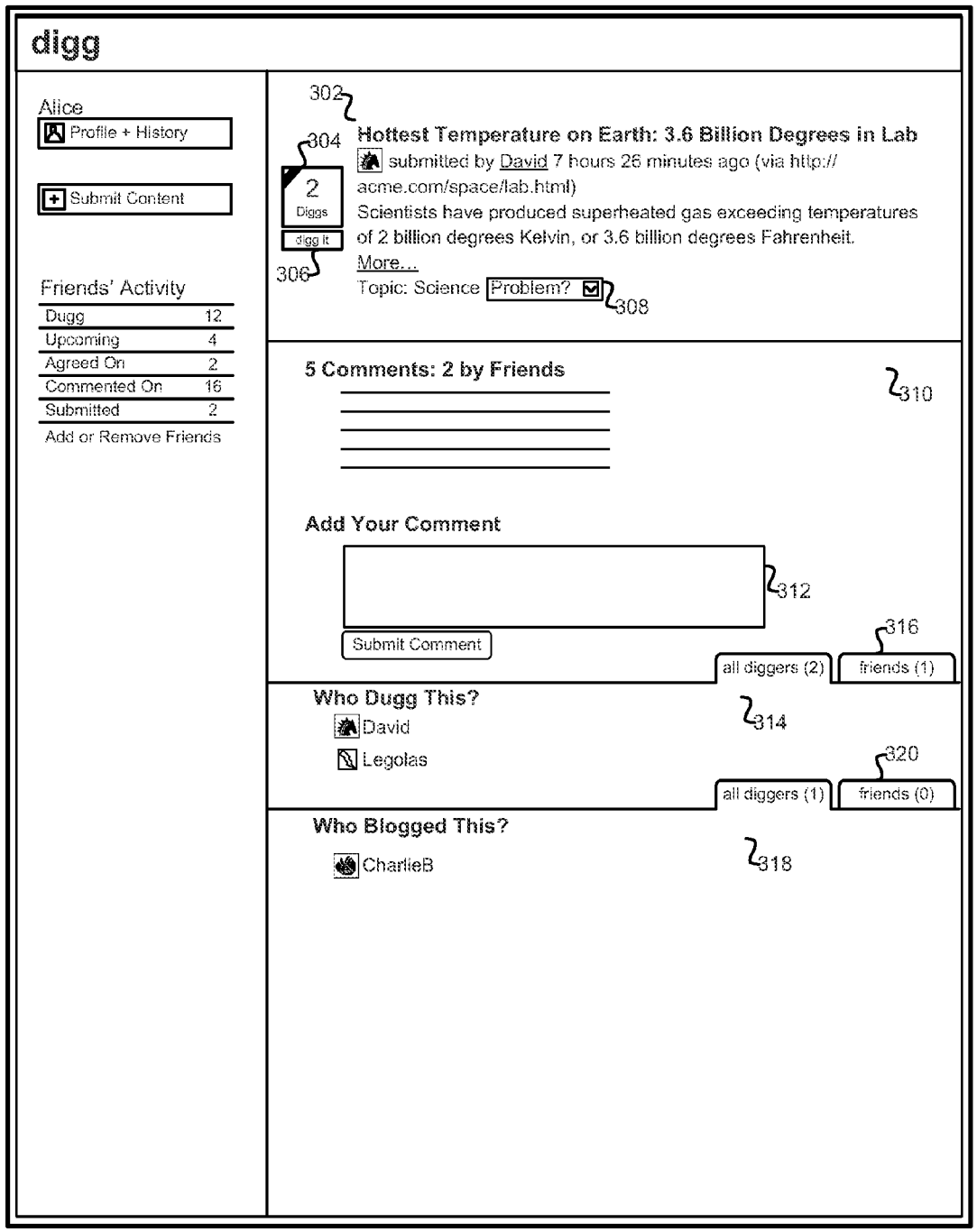
FIG. 3 illustrates an embodiment of a content permalink.

FIG. 3 illustrates an embodiment of a content permalink. The example shown is an implementation of a portion of website 116 as rendered in a browser. Each item submitted to system 102 has a corresponding permalink page that includes content assembled dynamically from the information stored in database 112.

In the example shown, content 302 (a news article) was recently submitted to server 102 (26 minutes ago) by a user, David, who also dugg the story. Alice has David listed under her profile as her friend. As a result, the digg count includes a visual indication 304 that article 302 was dugg by a friend. In some cases, Alice and David know each other and have each other, mutually, on their list of friends. In other cases, the relation may be one sided. For example, David may be a columnist or famous personality whose opinion Alice values.

The digg score of article 302 is currently two (304) and the article has not met the threshold(s) required for the story to be promoted out of the "upcoming" area.

In the interface shown in FIG. 3, Alice can click digg box 306 to indicate her preference for the article. In some embodiments, additional actions are taken when Alice diggs a story. For example, if she has configured her blog settings, Alice can specify that stories that she diggs be posted to her blog as she diggs them. Similarly, Alice can configure her personal website (e.g., with a JavaScript) to automatically syndicate recent activities taken in response to stories.

She can report a problem with the article (bury it) by selecting an option from problem dropdown 308. Reporting options include "duplicate" article (to report that article 302 is a duplicate of another article), "bad link" (to report that the link to the full text of the article is defective), "spam" (to indicate that the article is fraudulent or spam), "inaccurate" (to indicate that there are factual problems with the article), and "old news" and "this is lame" to indicate that the article is not newsworthy. In some embodiments, bury events are anonymous site wide and are not replicated, for example, in a user's publicly accessibly digging history. One reason for this is to minimize the chances of a "flame war" occurring, for example, when a well-known user negatively rates content or a comment. In other embodiments, bury events are made by users purely to indicate their dislike of an item.

In various embodiments, different problem reporting options are made available based on the type of content. For example, for video content, a bury option of "poor quality" can be included to allow users to report blocky, choppy, or otherwise defective video. For products, a bury option of "mine broke" would allow a user to indicate that the product was flimsy.

Region 310 displays comments that users have made about article 302. Thus far, a total of five comments have been left about article 302, two of which were left by Alice's friends. Alice can submit comments by entering information into region 312 of FIG. 3.

In region 314, Alice is currently viewing a list of all the users who dugg article 302. Suppose David is Alice's friend, but Legolas is not. If Alice selects friends tab 316, the view in region 314 will change to show only David's name and avatar icon.

In region 318, Alice is currently viewing a list of the users who have blogged article 302. Charlie is the only person who has blogged the article so far and he is not Alice's friend. Therefore, if Alice were to select friends tab 320, no names would be shown.

Figure 4:
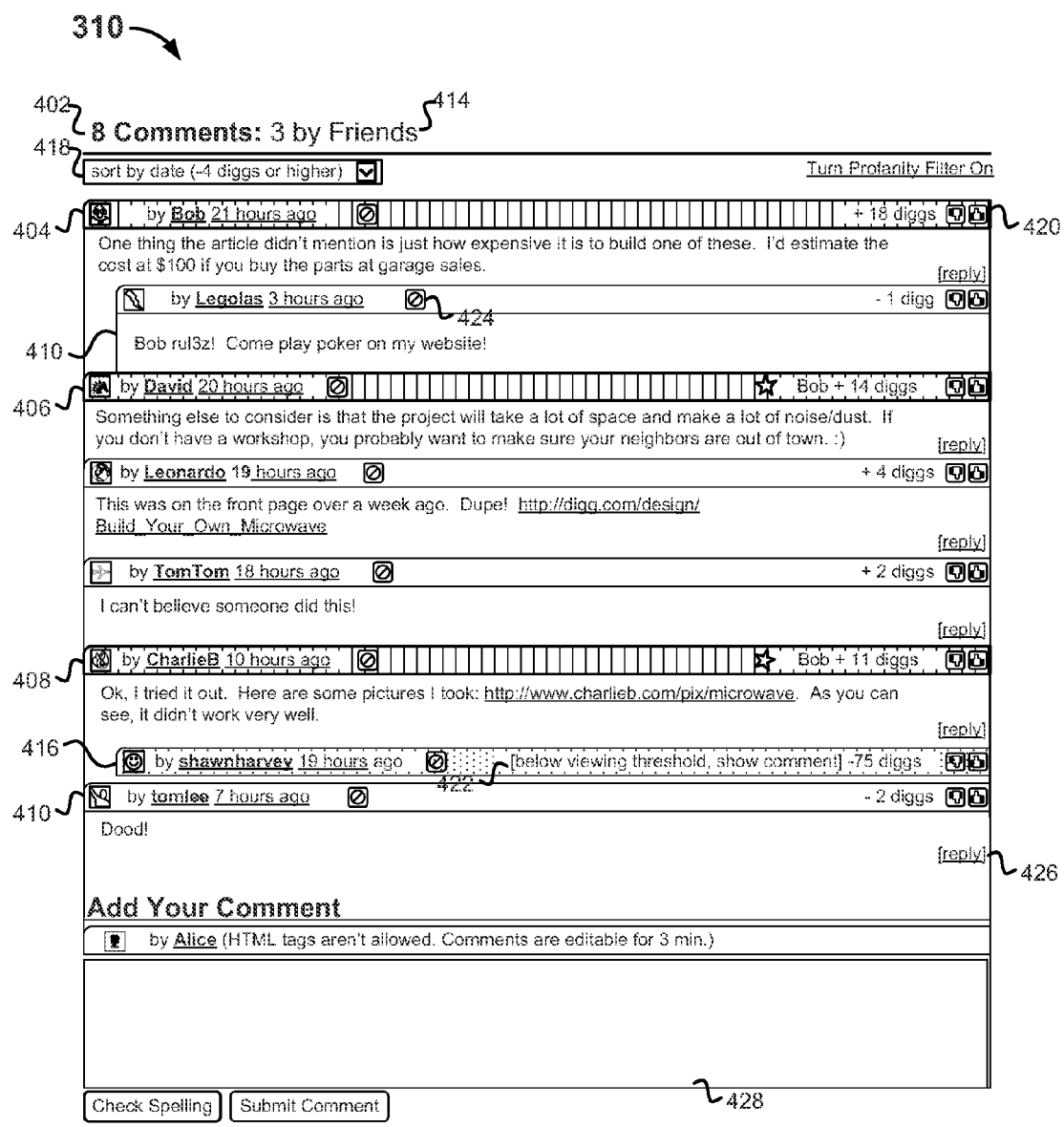
FIG. 4 illustrates an embodiment of an interface to a preference system.

FIG. 4 illustrates an embodiment of an interface to a preference system. The example shown is an implementation of portion 310 of website 116, as rendered in a browser. In the example shown, Alice is viewing comments associated with an article. The article currently has eight comments (402), sorted by date. A threshold of −4 diggs or higher has also been applied (418). Thus, comment 416, which has been buried 75 times, is hidden. In the example shown, only the header of a buried comment is displayed, along with a link to reveal the hidden comment (422). Additionally, the header of comment 416 is greyed out to help a user visually distinguish between buried and non-buried comments.

Comment 404 was written by Bob, one of Alice's friends, as was comment 406 (written by David). In this example, comments written by friends are distinguished from other comments, such as through having a differently colored header. Comments dugg by friends are also distinguished. In the example shown, Bob has written an informative comment, which 18 people have dugg. If desired, Alice can digg or bury Bob's comment by selecting the appropriate icon at 420. In the example shown, the digg icon is a green thumb pointing up. The bury icon is a red thumb pointing down. If Alice selects one of the icons, Bob's comment score is immediately updated and the thumbs are greyed out to indicate to Alice that she's already registered her preference for Bob's comment.

Suppose Alice finds comment 410 to be off topic or otherwise unhelpful. If she chooses to bury the comment, in the example shown, the comment score for comment 410 will decrement by one point. In some embodiments, if enough people bury a comment, the comment is removed from the site and/or reported to an administrator. If desired, Alice can submit one or more comments of her own. For example, she may reply to an existing comment by selecting the reply button associated with the comment (426) or create a new comment by submitting text through region 428. When Alice submits or diggs a comment, that preference event is recorded in database 112 and her profile and the profiles of her friends are immediately updated.

Figure 5:
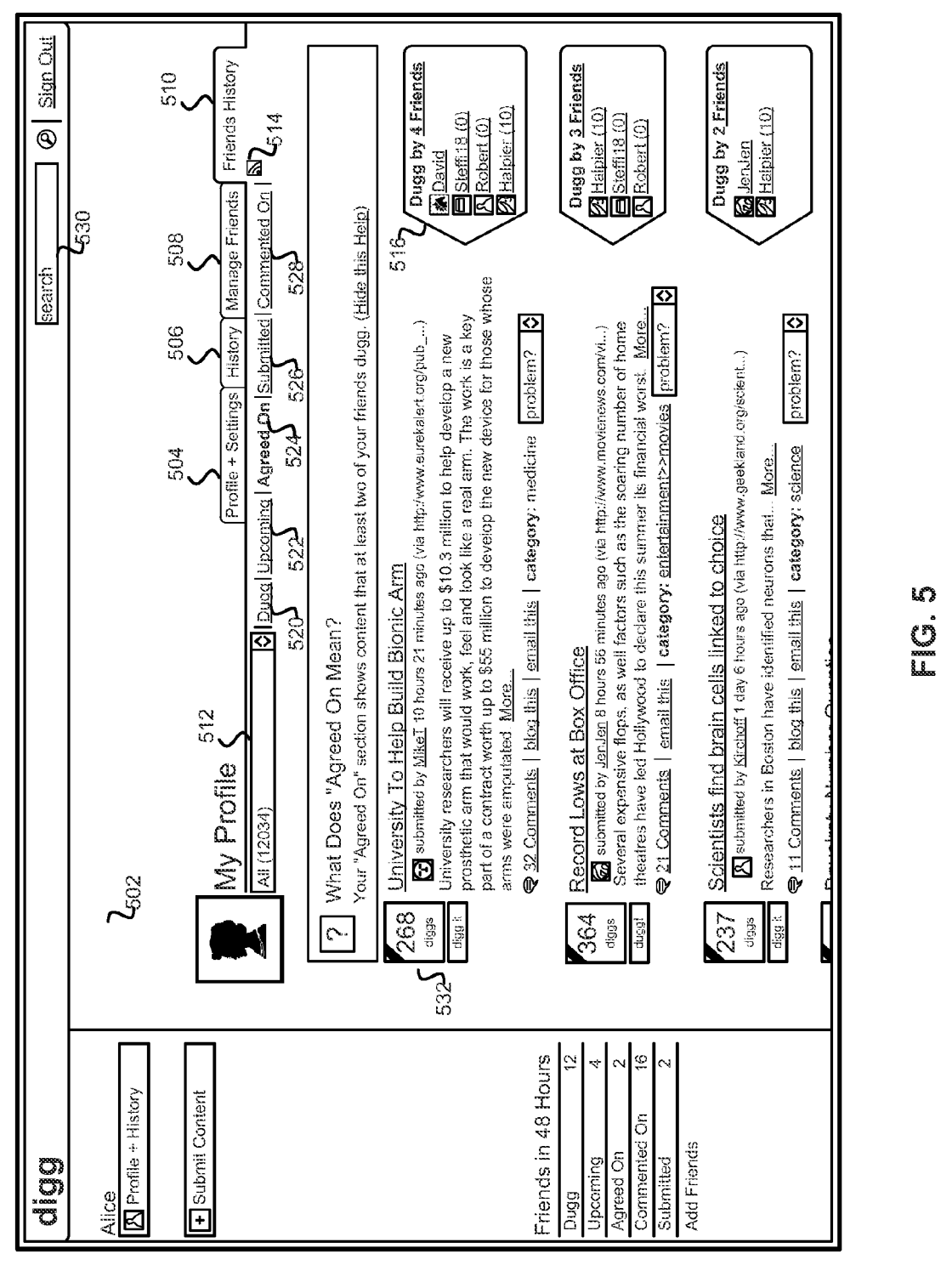

FIG. 5 illustrates an embodiment of an interface to a preference system. The example shown is an implementation of a portion of website 116 reached by selecting region 204, as rendered in a browser. In this example, Alice is viewing her profile (hereinafter "interface 502"), which has been subdivided into several tabbed views (504-510). A profile provides access to a variety of information, some of which may be publicly viewable and some of which may be kept private. Visitors to Alice's profile will be presented with a subset of the information available to Alice. For example, while Alice sees tab 504 being labeled "Profile+Settings," a visitor to Alice's profile would see tab 504 as leading to Alice's "Profile" only. Similarly, tab 508, which by selecting allows Alice to add and remove friends, is only available to Alice and is hidden from visitors to her profile. Alice can also add friends by visiting other users' profiles and selecting an "add this user as my friend" option located in the profile.

Alice has currently elected to view her friends' history by selecting portion 510 of interface 502. The information presented can be further customized by selecting from subsets of information. For example, if Alice selects portion 520 of interface 502, she will be presented with a listing of all of the stories that have been dugg by at least one of her friends. If she selects portion 522, she will be presented with a list of stories that have been dugg by at least one of her friends but have not yet been promoted. If she selects portion 526, Alice will be presented with a list of stories submitted by her friends and by selecting portion 528, Alice will be presented with a list of stories that have been commented on by her friends. Other information (not shown) may also be presented in other embodiments, such as a list of comments that Alice and/or her friends have dugg.

In the example shown, Alice has elected to view stories "agreed on" by her friends (524). Each of the stories listed in this view have been dugg by at least three of Alice's friends. In various embodiments, Alice can configure the threshold and specify such information as the number of friends (or total number of diggs) required for a story to be agreed upon and/or define particular individuals whose digg is necessary for a story to be considered agreed upon, keywords that must be present in the story, etc. By making use of the "agreed on" view, Alice can readily discern the most important stories, even if she has thousands of friends. (I.e., if she sets the threshold to "agreed on by at least 10 friends" and has 1000 friends, the number of stories she is presented with is likely to be manageable and especially relevant or interesting.) Region 516 of interface 502 indicates that four of Alice's friends have dugg story 532. Alice can also see which of her friends have dugg story 532 by hovering her input device over the digg score box of story 532.

By selecting portion 506 of interface 502, both Alice and visitors to Alice's profile will be presented with Alice's history in a format similar to that currently shown, but limited to activities taken by Alice. Additionally, Alice may "undigg" stories and comments that she previously dugg by visiting her history.

Suppose Bob has listed Alice as his friend. Whenever Alice submits a new story, that new story immediately appears on Bob's "Friends—Submitted" list. Similarly, whenever David comments on an article, that fact is immediately reflected under Alice's tab 528 as shown in FIG. 5. As described herein, pages served by web module 108 include Asynchronous JavaScript and XML (Ajax) components. Other techniques may also be used to dynamically update site 116 as rendered in a browser (or other application) as appropriate.

Figure 6:
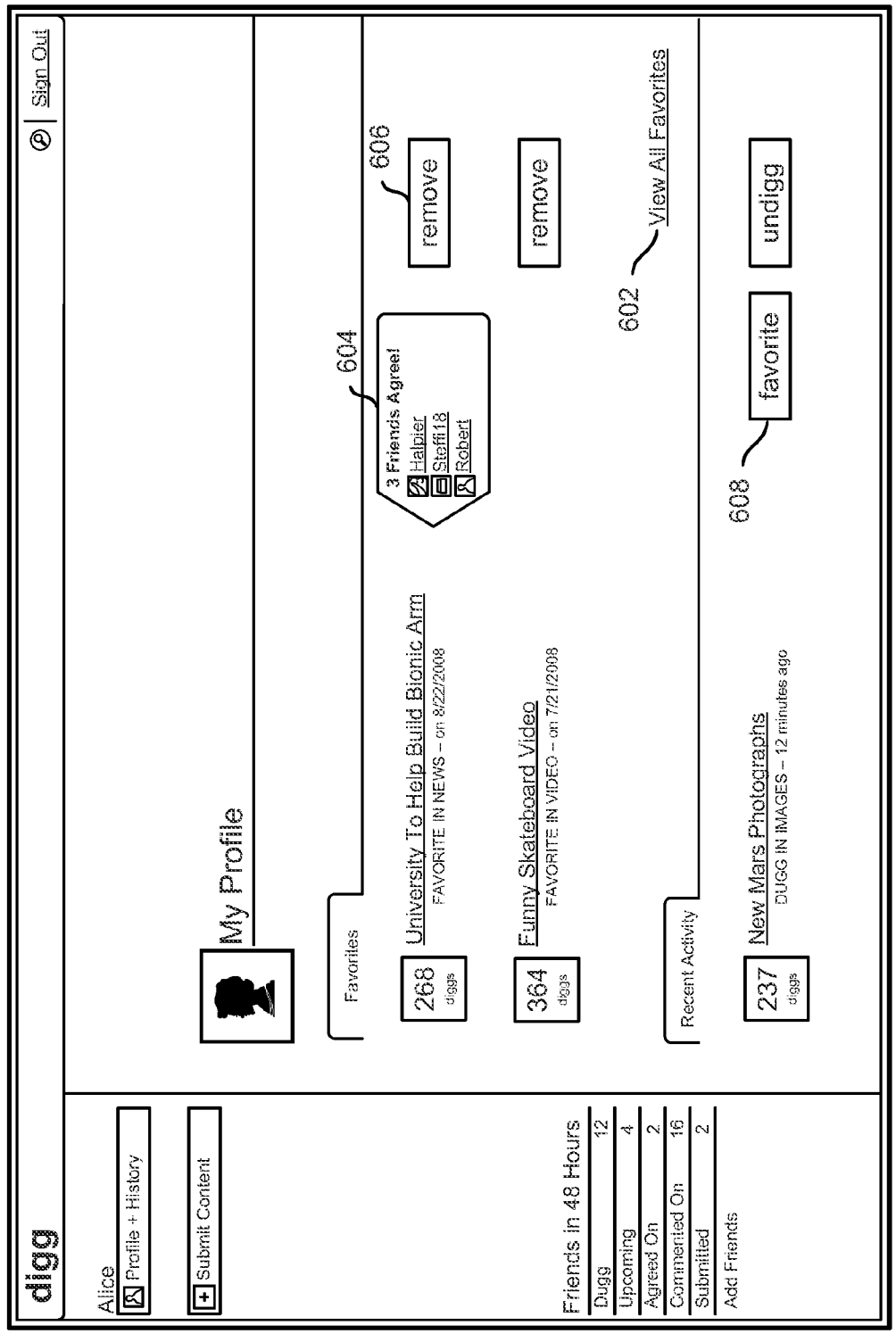
FIG. 6 illustrates an embodiment of an interface to a preference system.

FIG. 6 illustrates an embodiment of an interface to a preference system. In the example shown, Alice is viewing a list of items that she has designated as being her favorite, e.g. by selecting region 608. In some embodiments, Alice can have a single favorite item at any given time listed in her profile, also referred to herein as "My #1," indicating that the item is Alice's #1 favorite item. In other embodiments, Alice can have a single favorite item per category (e.g., favorite sports story, favorite politics story etc.) or per type of item (e.g., favorite restaurant, favorite video, favorite news item, favorite podcast, etc.). In any of the above cases, if she subsequently marks another item as "favorite" that newly selected item will replace the corresponding existing favorite item in Alice's profile. Items previously designated as "#1" are noted in an archive of "#1" items that can be accessed, e.g., by following a link 602.

In some embodiments, Alice can designate multiple favorites, in all categories/types of content, and a rolling list of the most recent designations is displayed in her profile, with older favorites accessible via link 602.

In various embodiments, the history of Alice's favorites is color coded. For example, more recent favorites are green and older ones are red. Other visual indicators may also be used. For example, the more users that have the same content designated as favorite, the brighter the designation appears. If the same content is designated as favorite by many users right now, that content is "hot" and appears with flames around it in the "favorite" section of Alice's profile. If only a few people have that content marked as a favorite, the content may be "icy cold" as indicated by a blue color scheme.

Alice can remove her "favorite" designation of content by selecting region 606. For example, suppose Alice designated a particular MP3 player (one that she owns) as a favorite. The MP3 player was actually of poor quality and subsequently broke. Alice does not want other users to think that she still approves of it, so she removes the favorite designation. If instead of breaking, Alice merely received a newer, better player, she may wish to retain the favorite designation for the old player, and also mark her new player as favorite, so that other users know that she likes both players. In some embodiments, if Alice undiggs a particular content, any favorite designations that she may have made with respect to that content are automatically removed.

Alice can also view the favorite content of her friends (and other users) by visiting their respective profiles and selecting a "favorites" tab. Alice can also perform a user search to find other users with similar favorites to discover new friends and/or to discover new content. For example, Alice could designate a particular restaurant as her favorite and then perform a search to determine "where people who also like my #1 restaurant buy books?" Alice could designate a movie as being her favorite and then determine "what news stories are people who also share my favorite movie reading now?"

Alice can also see which content she and her friends have commonly designated as favorite, e.g. through information displayed in region 604. In some embodiments, Alice can also see the aggregate favorites of her friends by selecting a "see my Friends' #1s" link within her own profile, which in turn shows one favorite per friend, such as the item most recently designated as favorite by that friend. The aggregate view is customizable, and also allows, e.g., Alice to sort the favorites by the number of friends who at one point in time (or currently) also have designated the content as a favorite.

Statistics on the favorite content of users site-wide is tracked and can be displayed according to different periods of time, different groups of users, different categories/types of content, etc. For example, Alice can view "the content most often designated as favorite of all time," search for "the most frequently #1 restaurant [bar, dry cleaner] in Chicago [or a zip code, or an area code]," see "the product with the most favorite designations right now," search for "the MP3 player with the most #1 designations between December 1 and January 31 of last year," find "the #1 fiction book as designated on the lists of female users between the ages of 13 and 25," and so on. A "top ten" list of favorite content can also be displayed, e.g. showing the relative positions of content based on the number of favorite designations, such as "this story is currently #3 in the ranking, up from #6 last week."

Time-based information can also be used to indicate the "staying power" of the favorite designations for content. For example, if many people leave the same content at the top of their favorite list before replacing it with other content, this statistic can be measured, searched for, etc. Examples include a search for "the content with the longest average streak of being a user's favorite content," "the content that, once designated as a favorite, remains a favorite the least amount of time," and so on.

Favorite content can also be analyzed to determine particular topics or subjects of interest to a user which can subsequently be consumed by modules such as server 106. For example, suppose Alice designates as favorite a photograph of the fictional town of Springfield, a video clip of The Simpsons television show, and an article about a chain of convenience stores redecorating with a Simpsons theme. Collectively, the content marked as favorite indicates that "The Simpsons" is a concept in which Alice has a strong interest.

Figure 7:
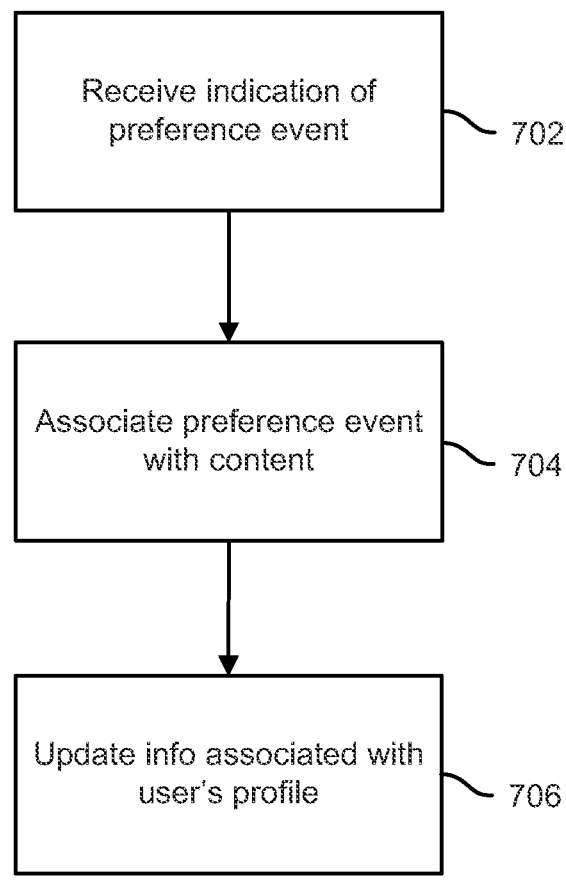
FIG. 7 is a flow chart illustrating an embodiment of a process for recording a preference for an item.

FIG. 7 is a flow chart illustrating an embodiment of a process for recording a preference for an item. The process begins at 702 when an indication that a preference event has occurred is received. For example, when Alice selects digg box 306 shown in FIG. 3, her preference is received at 702. Other examples of preference events include submitting an item, burying an item, and commenting on an item. At 704, the preference event is associated with the item and any associated scores are updated as applicable. For example, at 704, Alice and story 302 are linked in database 112 and the digg score of story 302 is increased in database 112 from two to three. At 706, information associated with the user's profile is updated. For example, views of Alice's digging history (including the friend views of users who have listed Alice as a friend) are updated to include the dugg story and an indication that Alice dugg it.

Additional Types of Items

As used herein, permalink pages for items made available via system 102 include links or other pointers to the original form of the content (e.g., news articles and podcasts), such as may be hosted by a third party publishing site. In some embodiments, users submit the content itself (e.g. the full text of articles and the audio file) rather than or in addition to a link to the content and the techniques described herein are adapted accordingly.

As explained above, items are not limited to news articles. Other items can also be submitted, dugg, buried, and/or commented on and the techniques described herein can be adapted as appropriate. For example, preference events taken on various types of items can be associated with a profile and shared with friends in a manner similar to that described in conjunction with FIG. 5.

Figures 8A, 8B:
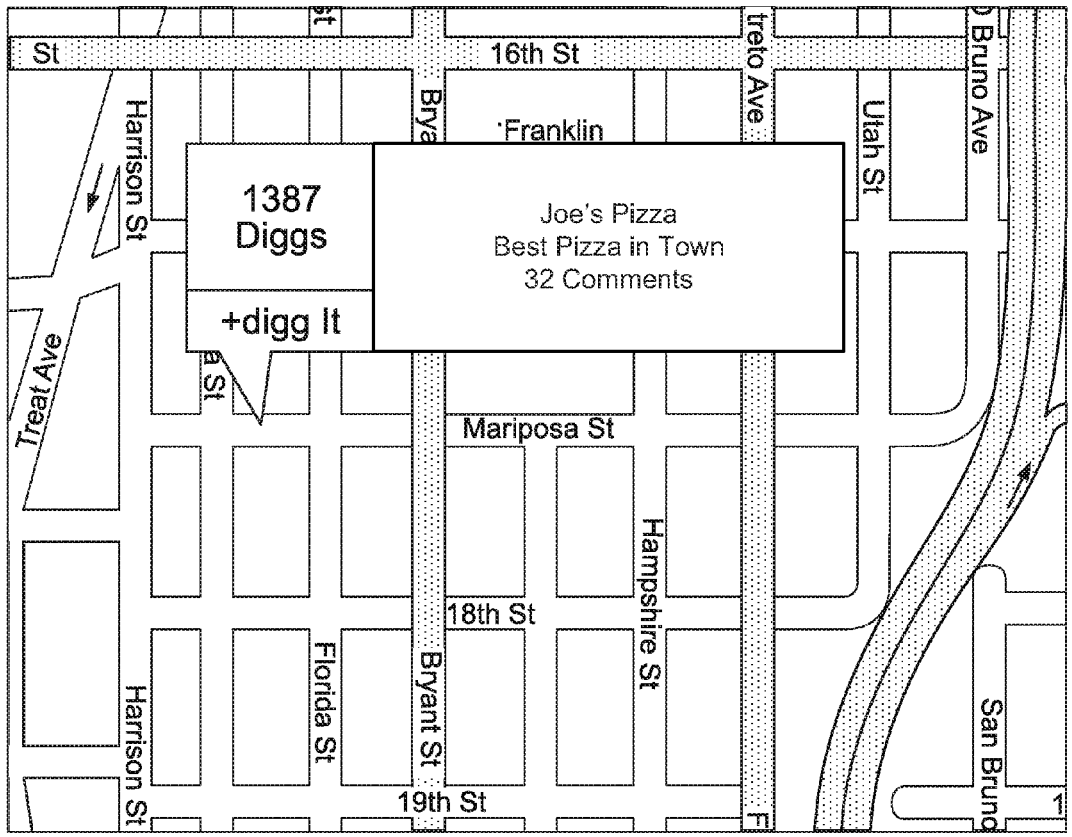
FIG. 8A is an example of an item.
FIG. 8B illustrates an embodiment of an interface to a preference system.

FIG. 8A is an example of an item. The example shown represents a restaurant submission. The name of the restaurant (802) is included, as is information such as who submitted the restaurant, the URL of the restaurant, the type of cuisine it serves (804), and the general location of the restaurant (806). Users may perform such actions as searching for restaurants by cuisine type and/or location and limiting results to ones having a threshold number of diggs. Restaurants having no or few diggs can be displayed as "upcoming restaurants," separated from "promoted restaurants" which have digg scores exceeding a threshold. Users can also supply additional information about their preferences for the restaurant, such as by supplying one or more tags (808) that indicate attributes such as "ambiance" or signature dishes. Which fields/tags are collected at submission time (and which, if any, can be added subsequently) and shown can be configured as appropriate depending on the type of content. For example, in the case of a product, a stock photo of the product may be included.

FIG. 8B illustrates an embodiment of an interface to a preference system. In the example shown, digging functionality has been combined with mapping functionality. When a user searches a map, such as a web-based map service, for nearby restaurants, entries on the map include an indication of the number of diggs a business has had and the ability to digg or comment on the business directly from the map interface.

Figure 9:
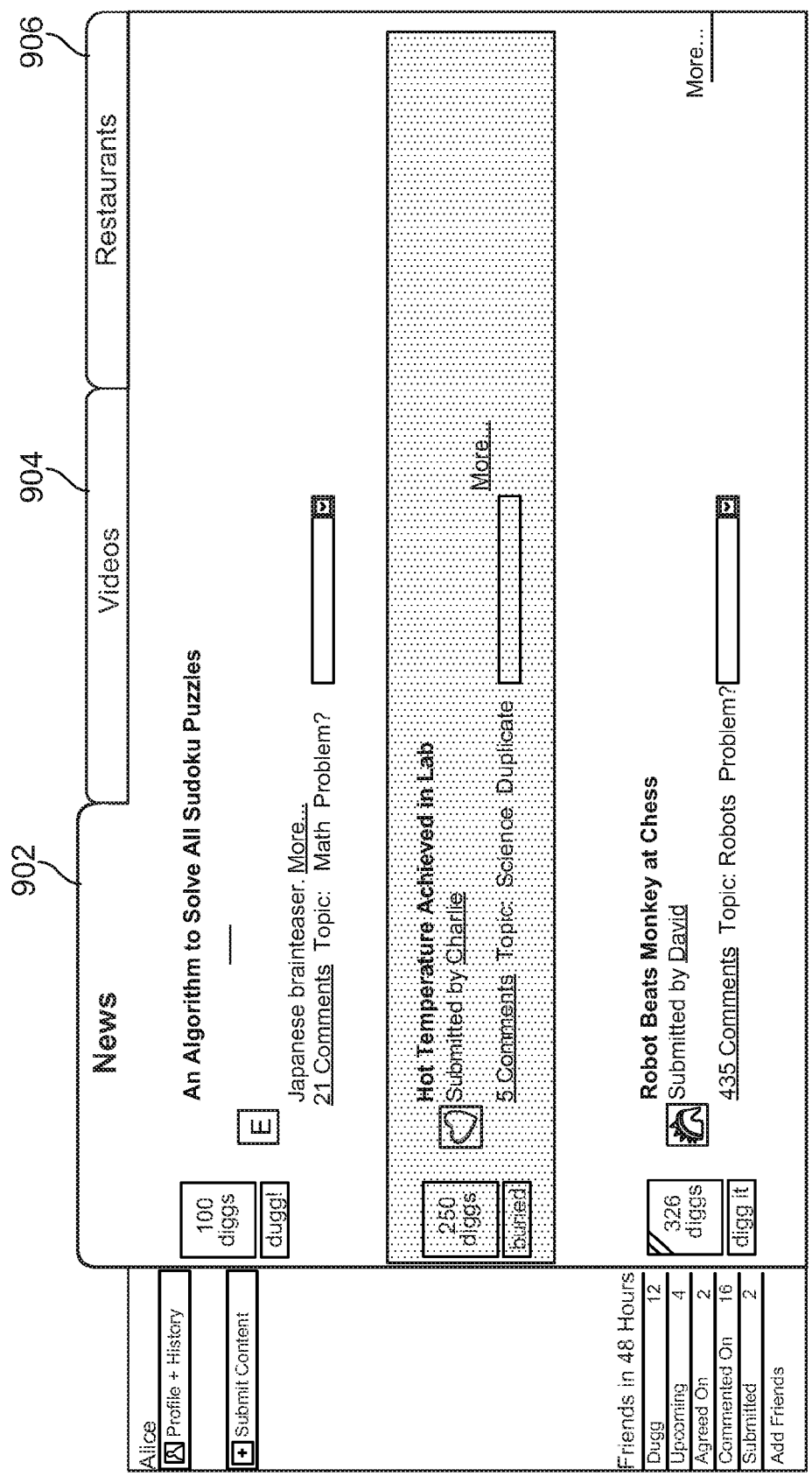
FIG. 9 illustrates an embodiment of an interface to a preference system.

FIG. 9 illustrates an embodiment of an interface to a preference system. In the example shown, the interface unifies a user's preference for items across multiple genres of content. For example, the user can digg for news (902), videos (904), and restaurants (906) all through the same interface. Additionally, using the interface shown in FIG. 9, a visitor to Alice's profile can learn which news stories she's been digging as well as learn which restaurants she diggs or doesn't digg. Similarly, Alice can customize the views of each of the tabs (902, 904, 906) to display only restaurants her friends of agreed on, restaurants nearby (e.g., by selecting a region on a map or entering a ZIP code) that at least one friend has dugg, etc.

Figure 10:
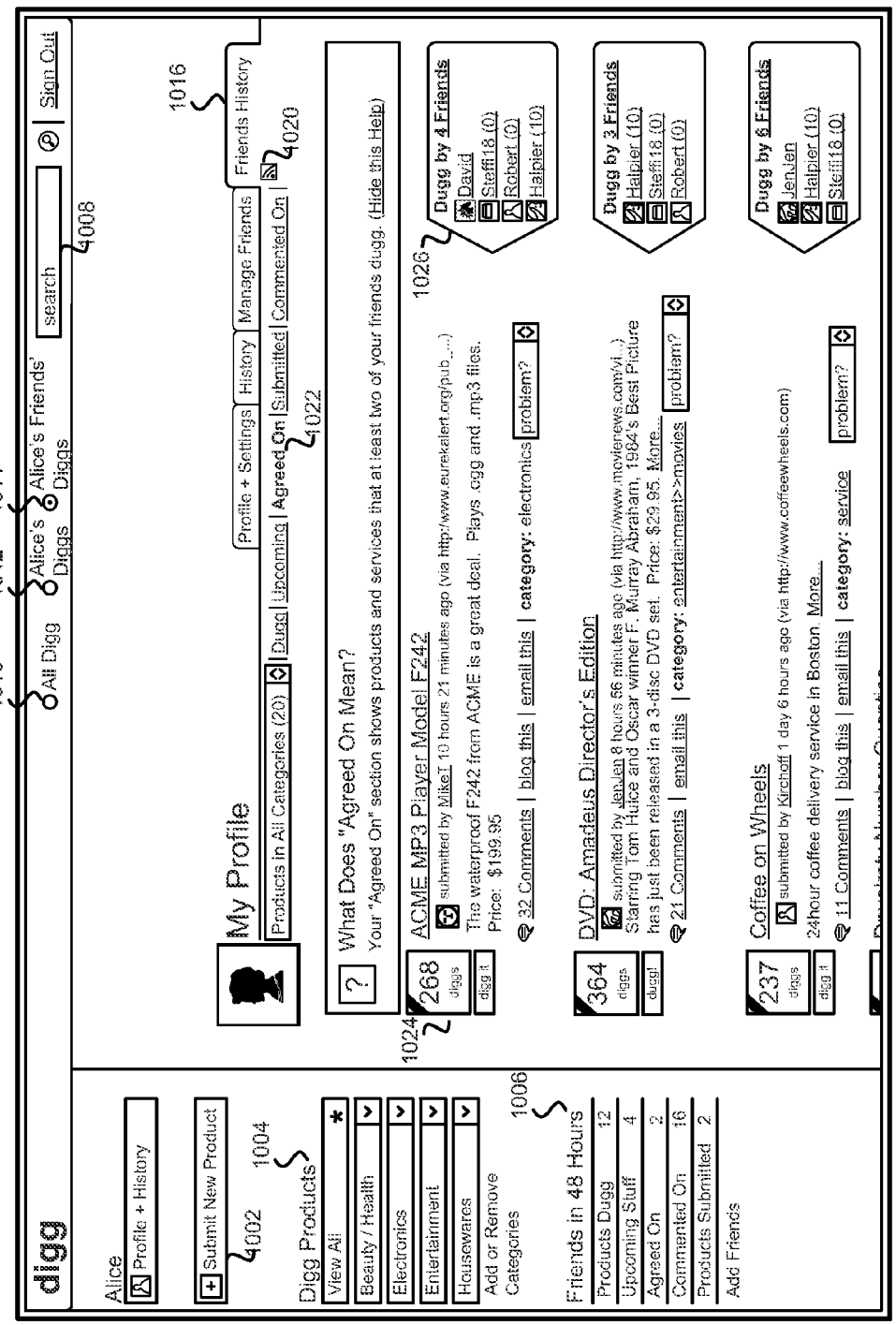
FIG. 10 illustrates an embodiment of an interface to a preference system.

FIG. 10 illustrates an embodiment of an interface to a preference system. The example shown is an implementation of a portion of website 116 which includes the ability to submit, digg, and comment on products (including software), as rendered in a browser. In this example, Alice has selected to view products agreed on by her friends (1022).

Alice can submit a new product review by selecting portion 1002 of interface 1000. She can view products in one or more categories by selecting the appropriate portion of region 1004. Portion 1006 of interface 1000 displays the recent activities of Alice's friends in a dashboard format.

Region 1026 of interface 1000 indicates that four of Alice's friends have dugg product 1024, the ACME MP3 player. Alice can also see which of her friends have dugg product 1024 by hovering her input device over the digg score box of product 1024. In some embodiments, Alice can interact with region 1026, such as by being presented with a dialogue that offers to send an email to all of her friends listed in the region. In some embodiments, additional actions can be taken with product 1024. For example, Alice may be presented a "buy this product now" icon or link.

In some embodiments, profile visitors (including Alice) are presented with the option to search (1008) all of site 116 for product keywords (1010), search Alice's diggs for product keywords (1012), and/or search diggs made by Alice's friends for product keywords (1014). For example, a visitor to Alice's profile can search for MP3 players that she has dugg or commented on. In some embodiments, search interface 1008 includes the ability to filter results on meta information such as regions for DVDs, languages for books, etc. In some embodiments, views (and searches) can be limited by other factors, such as location (distance from Alice), availability (whether a product is in stock and how quickly it can arrive), etc.

Figure 11:
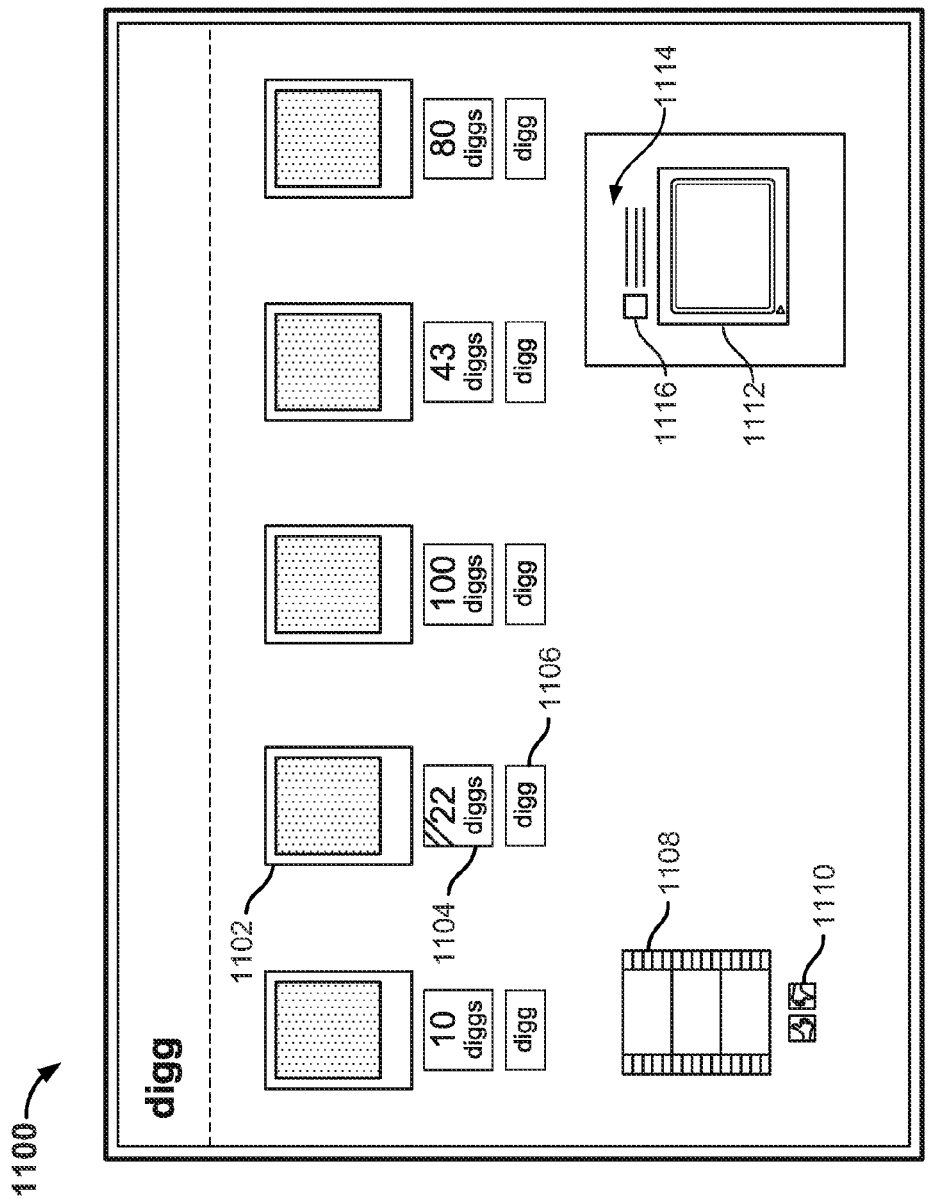
FIG. 11 illustrates an embodiment of an interface to a preference system.

FIG. 11 illustrates an embodiment of an interface to a preference system. The example shown is an implementation of a portion of website 116 which includes the ability to submit, digg, and comment on photographs and video, as rendered in a browser. In the example shown, photograph 1102 was dugg by a friend, as indicated by banner 1104. By selecting digg box 1106, a visitor can indicate a preference for the photograph shown. In some embodiments, visitors indicate their preference for content such as video 1108 by selecting an icon such as icon 1110.

The content shown in interface 1100 can be presented in a variety of ways. For example, video content may be represented as an icon, such as the filmstrip icon shown at 1108. A screen shot of the first frame of the video may also be shown, and interactions, such as hovering a mouse over region 1108 could trigger actions such as causing the video to be played in the browser. In some cases, it may not be possible to embed the content directly into the interface shown in FIG. 11. In such a case, the video is shown in a format similar to item 210 (1116) and a preview button 1114 is included. When preview button 1114 is selected, a video player 1112 automatically slides out in which the video can be displayed. Permalink pages, such as the one shown in FIG. 3, can be adapted for photograph and video content as appropriate and users may comment, blog, and take other actions with respect to visual and other content (such as songs) as appropriate.

Evaluating an Item Based on User Reputation Information

As mentioned in conjunction with FIG. 2, a variety of techniques can be used to evaluate the quality/popularity of an item and to determine, for example, whether such an item should be "promoted" out of the upcoming area or similar area and shown on the main page or other appropriate location. In various embodiments, user reputation information is considered when evaluating an item.

A user reputation score approximates how good a particular user is at submitting and/or locating "good" items and in some embodiments how good a particular user is at identifying "bad" items (e.g., by burying them). Spammers (e.g., trying to increase the popularity of questionable items) and followers (e.g., who become interested in items only after thousands of other people already have) are examples of people who are not generally considered "good" at surfacing good items. There also exist influential individuals (and discerning individuals) that recognize meritorious items before others. Such individuals receive higher user reputation scores than individuals such as spammers. One way of determining a user reputation score is to construct a graph based on sharing events. Each sharing event can be considered an implicit vote for the users that preceded a given user in sharing an item. As will be described in more detail below, reputation scores can be computed by solving for self-consistent flows on graph links.

Figure 12:
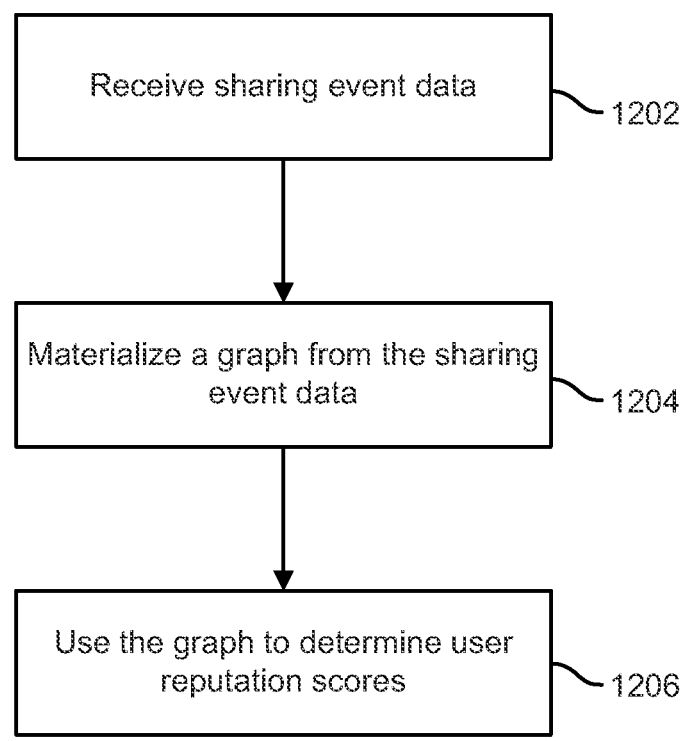
FIG. 12 is a flow chart illustrating an embodiment of a process for determining user reputation scores.

FIG. 12 is a flow chart illustrating an embodiment of a process for determining user reputation scores. In some embodiments the process shown in FIG. 12 is performed by user reputation engine 110. The process begins at 1202 when sharing event data is received. A sharing event occurs whenever a first user of system 102 propagates a preference for (or against) an item. Examples of sharing events include the preference events described above such as diggs, buries, comments, and submissions of content. Other examples of sharing events include the user clicking on a "share this story" link that sends a notification about the item via email, Facebook, Twitter, or any other appropriate communication mechanism. Each time a sharing event is detected (e.g., via system 102), the event is stored in an event log, such as log 114. At 1202, information from event log 114 is received. Included in the log are the identity of the user that took the sharing action, a timestamp of the sharing event, and an indication of the item being shared. In some embodiments, a single event log 114 is maintained. In other embodiments, multiple event logs, such as one for each item, are maintained and the information included in each log adapted as applicable. The information received at 1202 may comprise all sharing events and may also be limited or otherwise filtered, such as by pertaining to the last thirty days of sharing events.

Figure 13:
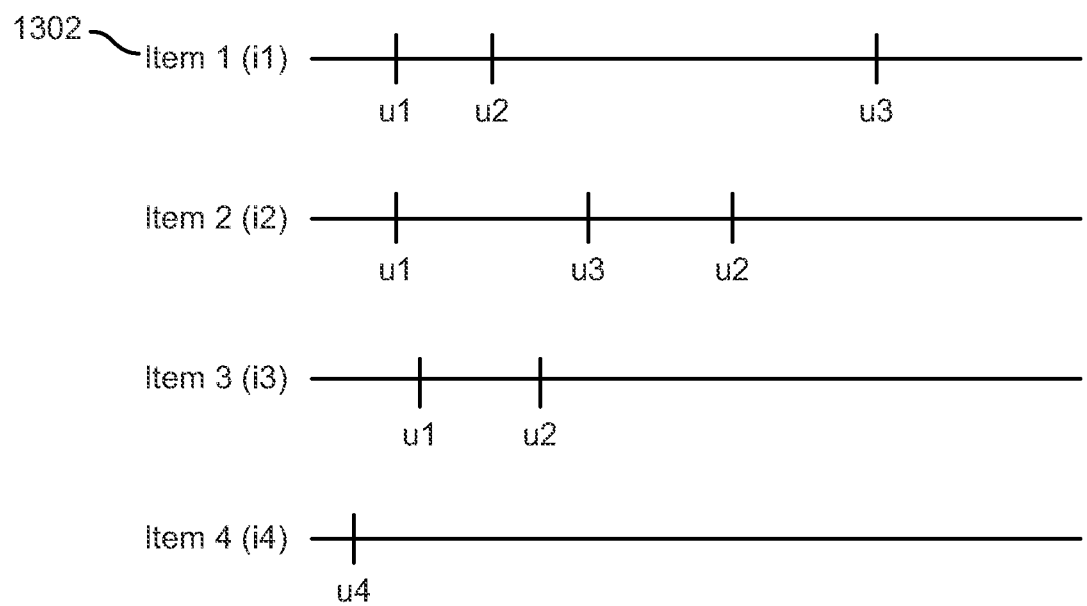
FIG. 13 is a representation of sharing event log information, depicted as a set of timelines.

FIG. 13 is a representation of sharing event log information, depicted as a set of timelines. In the example shown, log information pertaining to four items (i1, i2, i3, and i4) is included. The first item was shared by a user u1, then a user u2, and then by a user u3. The second item was shared by user u1, then user u3, and then user u2. The third item was shared by user u1 and then user u2. The final item was shared only by user u4. As will be used herein, user u1 is a "pre-sharer" of users u2 and u3 with respect to item i1. User u2 is a "post-sharer" of user u1 but a pre-sharer of user u3 with respect to item i1.

Returning to the process of FIG. 12: At 1204, a graph is materialized from the sharing event data. A variety of techniques can be used to construct a graph from the sharing event log information. One example is depicted in FIG. 14.

Figure 14:
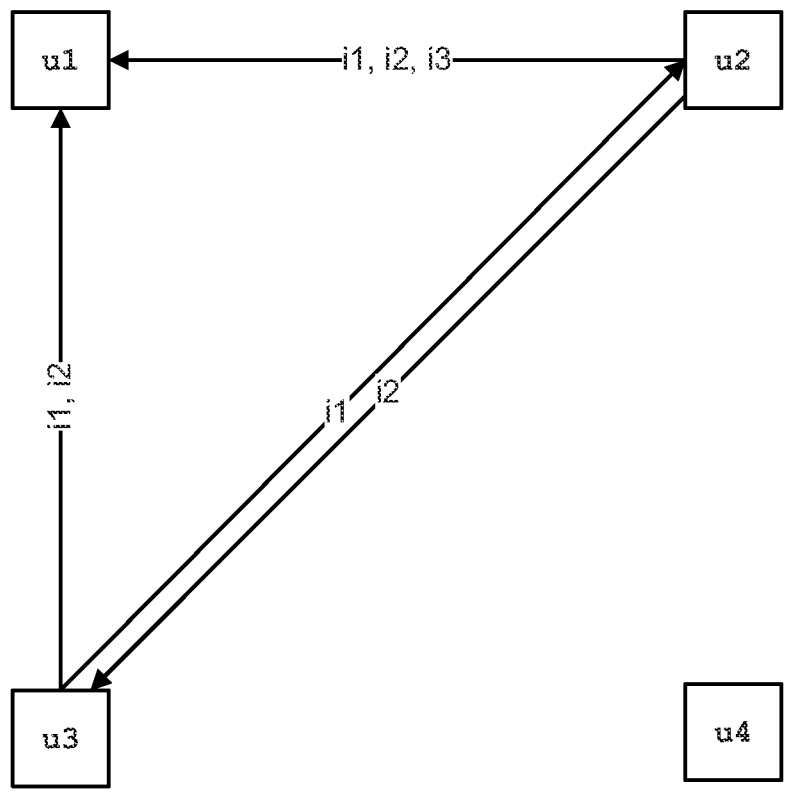
FIG. 14 is a depiction of a graph that can be constructed from sharing event log information.

FIG. 14 is a depiction of a graph that can be constructed from sharing event log information. In the example shown, the nodes are users (e.g., users u1, u2, u3, and u4). For each item that has been shared, a directed link is created from the sharer to all pre-sharers of the item. Thus, as shown in FIG. 14, three links exist from user u2 to user u1, because user u1 preceded user u2 in digging three items (i1, i2, and i3). User u4 is not linked with any other users because none of the other users shared item i4.

Alternate techniques can also be used to construct a graph at 1204. For example, a single link per share can be created (e.g., to the immediately preceding sharer). Using the data shown at 1302 as an example, in such a scheme, only links from u3 to u2 and from u2 to u1 would be created. As another example, links could be created only to the first sharer of item (or to the first "n" sharers of the item). Using the data shown at 1302, the result of this scheme would have a link from u3 to u1 and from u2 to u1, but no link from u3 to u2. As yet another example, different graphs for different types of sharing events can be constructed, such as with one graph being constructed for digging-based shares and another constructed for buries. Weights can also be applied to the graph—such as with digg-based shares having a weight of "1" and email-based shares having a weight of "2." The choices of how to construct the graph at 1204 affect the scale of computations as well as the resulting reputation values and can be selected based on factors, such as the available computing resources, the number of users in the environment, and the number of items in the environment.

Returning to the process of FIG. 12: At 1206, user reputation scores are computed from the graph materialized at 1204. One approach is to determine the maximal eigenvector d of a stochastic positive matrix M: Md=d, where the matrix elements of M are determined by the connectivity of the user graph. A matrix based on pure connectivity can be used. Other matrices can also be used and the techniques adapted accordingly. For example, matrix M could be constructed as $$M = \alpha H + \alpha A + \frac{1-\alpha}{N} - 1$$

where H is a specialized form of connectivity matrix, A is a matrix containing all zeros in columns corresponding to postsharers and all ones in columns of sunk users (who never post-shared any other user), 1 is the unit matrix, and N is the total number of users. An example of such a specialized connectivity matrix H is $$H_{ij} = \frac{1}{|D_i|} \sum_{s \in P_{ij}} \frac{1}{|R_{is}|}$$

where $D_i$ is the set of items shared by user i, $P_{ij}$ is the subset of $D_i$ where user j pre-shared user i, and $R_{is}$ is the number of pre-sharers user i has for item s. Various high-level weight controls can also be used, such as by treating sharing events performed in region 208 differently from sharing events performed with respect to items reached by clicking the upcoming content tab 226, through the use of weights on the links.

In various embodiments, system 102 is configured to construct a graph that is optimized for use with eigenvector centrality. The centrality graph is a directed weighted multi-graph that is represented as a square matrix where the row and column indices are user identifiers and the length of each dimension is the number of users. The matrix columns represent source user nodes and the rows represent destination user nodes. A source user is defined as a post-sharer, while a destination user is defined as a pre-sharer. An element in the matrix is the directed connection proportion between the two users indexed. Each user gets a total of one vote in the matrix, which is divided among all users who pre-shared an item. For example, suppose $user_u$ shares $item_i$. $User_u$ implicitly votes equally for every user who preshared $item_i$. In particular, the vote amount given to each pre-sharer is $$\frac{1}{user_u \text{ post-share count}/item_i \text{ pre-share count}},$$

where $user_u$ post-share count is the total number of sharing events made by $user_u$ where another user pre-shared $user_u$. Here, the sum of $user_u$'s votes is exactly 1 and as a result the matrix columns sum to 1.

The output is an eigenvector where the indices are user identifiers and elements are relative user reputation scores as real numbers in the interval [0,1]. The centrality eigenvector is calculated by the power-iteration Krylov subspace method, which is the repeated multiplication of the connectivity matrix by the current best-guess eigenvector. The vector is initialized to the uniform distribution and eventually converges to the dominant stationary eigenvector. In order to guarantee that all elements are positive and that all columns sum to 1, the connectivity matrix can be modified, as applicable. Specifically, the column can be changed to the uniform distribution and the zero elements that occur when a user is not connected to another user can be addressed by adding a small connection weight to all users evenly. Finally, constant coefficient α can be included to balance the weight between the actual connectivity matrix and the uniform matrix required for convergence. The actual connectivity matrix receives weight α and the uniform matrix receives weight 1−α. The parameter α typically is set between 0.8 and 1.0 and is in some embodiments set to 0.99. Finally, in order to prevent reputation scores from being positively correlated with sharing event counts, in some embodiments the raw centrality score is divided by the user's sharing event count, normalizing the centrality score to be the average centrality per sharing event. The final centrality score is canonicalized as a percentile rank and can be stored in database 112 for use by other elements of system 102, such as item scoring engine 118. In various embodiments, the process of FIG. 12 is performed at regular intervals, such as a nightly batch job.

Figure 15:
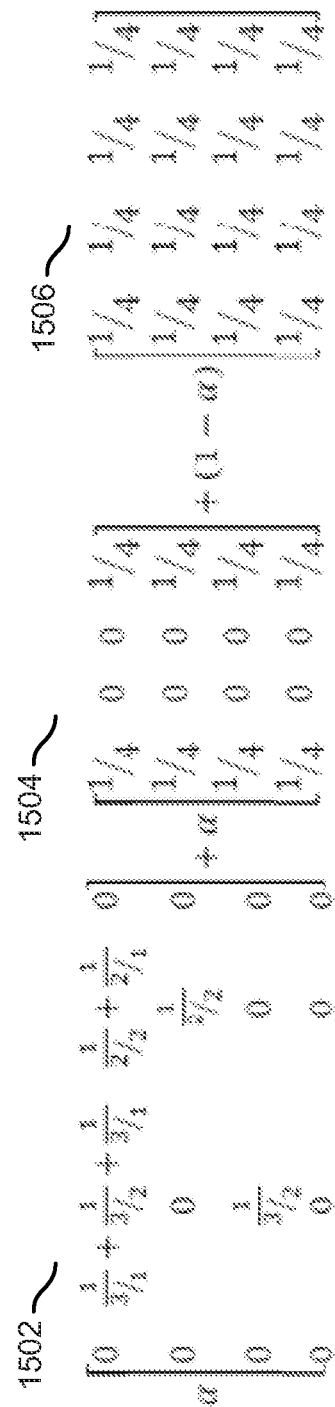
FIG. 15 illustrates a set of matrices used to compute user reputation information.

FIG. 15 illustrates a set of matrices used to compute user reputation information. In the example shown, a connectivity matrix is formed by combining a raw connectivity matrix 1502 (e.g. corresponding to the graph shown in FIG. 14) with two matrices that guarantee convergence (1504 and 1506), weighted by the parameter α.

In various embodiments, the process of FIG. 12 is implemented in Python and makes use of the NumPy multi-dimensional array extension package. The centrality calculation (described in more detail below) is fast and memory-efficient. Matrix-vector multiplication is performed by rephrasing matrix-vector multiplication as operations on arrays. The centrality calculation is performed incrementally on a per-item basis where the data structure is a per-item collection of arrays where the ordinal array positions align to represent a single user's share event of that item. As a result, calculating the per-item marginal centrality score can be done quickly as item-wise vector operations. For example, to calculate the marginal centrality score for $item_i$, three arrays are needed, ordered chronologically by share time: $A_1$ is an array of current best-guess centrality scores of users who shared item $item_i$. $A_2$ is an array of the total number of post-shares for each user who shared $item_i$. $A_3$ is an array of pre-sharer counts on $item_i$, for each user who dug $item_i$. The marginal centrality vector for $item_i$ is the cumulative sum of $$A_1/A_2/A_3.$$

Subsequently, the marginal centrality vector is padded on the left with a single 0 to realign the cumulative sum with the proper user indices. The per-item marginal centrality scores are accumulated across all items to form one iteration. Further, the modifications described above for convergence can be factored out and calculated once per iteration for the entire matrix.

Figure 16:
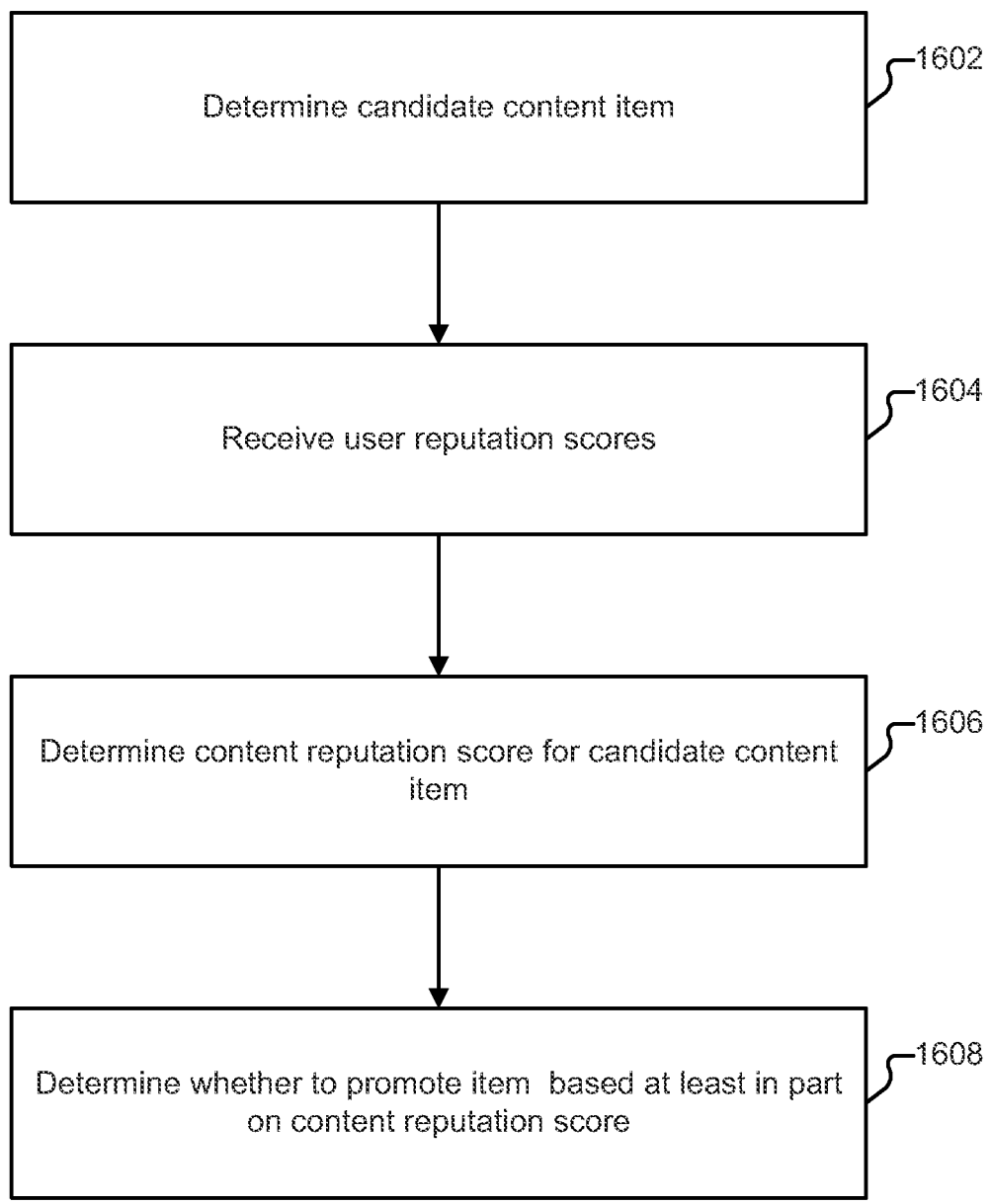
FIG. 16 is a flow chart illustrating an embodiment of a process for evaluating an item.

FIG. 16 is a flow chart illustrating an embodiment of a process for evaluating an item. In some embodiments the process shown in FIG. 16 is performed by item scoring engine 118. The process begins at 1602 when one or more candidate content items are determined. For example, at 1602, all of the items in the upcoming stories pool might be selected. In various embodiments, all items are scored in accordance with the process shown in FIG. 16. Optional pruning of the candidates may also be performed at 1602. For example, stories more than 48 hours old, items reported as violating a term of service, or otherwise meeting pruning criteria may be removed from the set of candidate content items at 1602.

At 1604, user reputation scores are received, such as from user reputation engine 110.

At 1606, a content reputation score is determined for each item in the group of candidate content items. One way of calculating a content reputation score is to sum the user reputation scores of each of the users that dugg (or shared) the story. In various embodiments, the user reputation scores of some users are not considered at 1606. For example, users that have recently registered may not have their user reputation scores be used in any computations until two weeks have elapsed.

At 1608, a determination is made as to whether or not the content should be promoted. For example, at 1608 the content reputation score for each candidate content item is compared against a threshold. If the threshold is exceeded, the content is promoted. In various embodiments, additional checks and/or throttling are performed at 1608. For example, item scoring engine 118 may be configured to perform the processing shown in FIG. 16 as a regularly occurring batch process. For any particular iteration of the process, a limit may be imposed by scoring engine 118 on the number and/or nature of content that can be promoted. For example, scoring engine 118 can be configured with a rule that only five images may be promoted per execution of the process, that a maximum of one story per category may be promoted, or that a total of ten items may be promoted per cycle, across all content.

In some embodiments, items that are otherwise promotable (e.g., that have item reputation scores exceeding the appropriate threshold) are sorted based on the ratio between their respective item reputation scores and the applicable threshold values. The ratio (e.g., the sorted list) is used as tie breaker information in the event that more content is promotable than the rules allow to be promoted. In some embodiments, promotable items that are not promoted are considered for promotion on the next iteration of the process shown in FIG. 15. In other embodiments, promotable items are placed in a queue and released from the queue after a period of time has elapsed. In some embodiments, all promotable items are placed in a queue prior to promotion so that an administrator has time to review the content for violations of service terms or other reasons.

In some embodiments, different thresholds are used for determining whether to promote items in different categories and/or items of different types. For example, a higher threshold may be used for the promotion of sports news than for the promotion of astronomy photographs. Additionally, multiple thresholds can be employed when determining whether to promote a particular item, such as requiring that a total digg count threshold be exceeded for the story, along with the item reputation threshold. In the event that a total digg count is considered, in some embodiments the total digg count for the item is evaluated at 1602 as part of the initial candidate selection.

Figure 17:
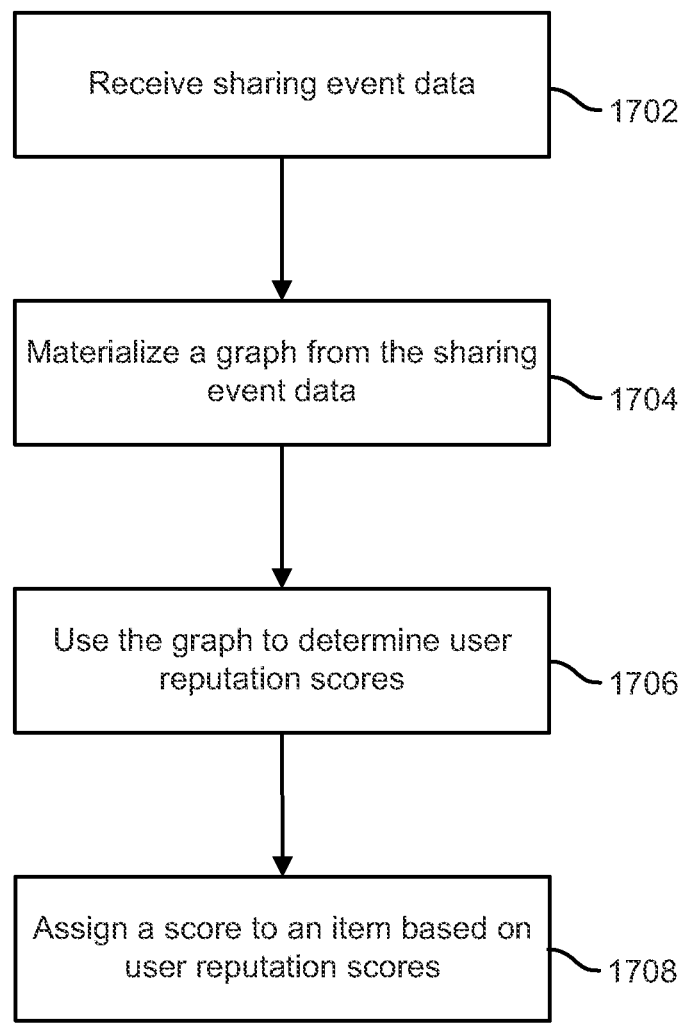
FIG. 17 is a flow chart illustrating an embodiment of a process for evaluating an item.

FIG. 17 is a flow chart illustrating an embodiment of a process for evaluating an item. In some embodiments the process shown in FIG. 17 is performed by system 102. The process begins at 1702 when sharing event data is received. As one example, at 1702, information from event log 114 is received. At 1704, a graph is materialized from the sharing event data. At 1706, user reputation scores are computed from the graph materialized at 1704. Finally, at 1708, a score is assigned to an item. As one example, at 1708, item scoring engine 118 assigns scores to items based on the user reputation scores computed at 1706.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for evaluating content items served by the system to multiple users who initiate sharing events regarding the content items, the system comprising:
a processor configured to:
receive sharing event data reflecting the sharing events initiated by the multiple users, including, for each content item, an initial sharing event initiated by an initial user;
determine, for each content item, a time-based order of the sharing events reflected in the sharing event data;
generate a graph based on the sharing event data, the graph comprising:
a separate node corresponding to each of the multiple users that initiated a sharing event; and
for each content item, for each given user that initiated a sharing event for the content item, other than the initial user who initiated the initial sharing event for the content item, at least one directed link from the given user's corresponding node to a node corresponding to another user who initiated a sharing event for the content item before the given user;
determine user reputation scores for the multiple users based on connectivity of the graph; and
for each content item, combine the user reputation scores of the users that initiated sharing events for the content item to produce a score for the item; and
a memory coupled to the processor and configured to provide the processor with instructions.

2. The system of claim 1, wherein the sharing event data includes multiple preference events initiated by the multiple users while viewing the content items.

3. The system of claim 2, wherein each preference event is one of:
a positive preference event; and
a negative preference event.

4. The system of claim 1, wherein the sharing event data includes at least one sharing event in which one of the multiple users:
viewed a content item served by the system; and
activated a control served by the system to accompany the content item;
wherein activation of the control caused the content item to be shared with one or more other users.

5. The system of claim 1, wherein the processor is further configured to log the sharing event data by recording, for each sharing event:
an identity of the user that initiated the sharing event;
a timestamp of the sharing event; and
an identity of the content item associated with the sharing event.

6. The system of claim 5, wherein:
the system further comprises a database; and
sharing events of different types are stored in separate logs of the database.

7. The system of claim 5, wherein the sharing events are stored as an ordered list ordered by the timestamps.

8. The system of claim 1, wherein:
determining a time-based order comprises, for each sharing event initiated by a given user for a given content item, identifying one or more of a pre-sharer and a post-sharer;
a pre-sharer is a user who initiated a sharing event for the given content item before the given user; and
a post-sharer is a user who initiated a sharing event for the given content item after the given user.

9. The system of claim 1, wherein generating the graph comprises:
for each content item, for each given user that initiated a sharing event for the content item, other than the initial user who initiated the initial sharing event for the content item, graphing directed links from the given user's corresponding node to nodes corresponding to all other users who initiated sharing events for the content item before the given user.

10. The system of claim 1, wherein generating the graph comprises:

for each content item, for each given user that initiated a sharing event for the content item, other than the initial user who initiated the initial sharing event for the content item, graphing a single directed link from the given user's corresponding node to the one node corresponding to the user who initiated a sharing event for the content item most recently in time before the given user.

11. The system of claim 1, wherein generating the graph comprises replacing multiple directed links from a first user to a second user with a single link.

12. The system of claim 1, wherein generating the graph comprises:
weighting each directed link according to a type of sharing event between the users corresponding to the nodes connected by the directed link, wherein directed links corresponding to different types of sharing events have different weights.

13. The system of claim 1, wherein generating the graph comprises generating the graph for only one type of sharing event, and wherein the processor is further configured to:
repeat said generating to generate a second graph for sharing events of a second type.

14. The system of claim 1, wherein determining user reputation scores comprises:
assembling a specialized connectivity matrix H based on connectivity of the graph, wherein:
i and j represent different users in the multiple users;
$D_i$ is a set of content items for which user i initiated sharing events;
$P_{ij}$ is a subset of $D_i$ for which user j initiated a sharing event for a given content item before user i initiated a sharing event for the given content item;
$R_{is}$ is a number of users who initiated sharing events for content item s before user i; and $$H_{ij} = \frac{1}{|D_i|} \sum_{s \in P_{ij}} \frac{1}{|R_{is}|}.$$

15. The system of claim 14, wherein determining user reputation scores further comprises:
assembling a matrix M representing connectivity of the graph, wherein:
N is a total number of nodes of the graph;
A is a matrix having a column for each node, wherein every column corresponding to a node at the origin of a directed link comprises the value zero, and every column corresponding to a node that is not at the origin of any directed link comprises the value one;
1 is the unit matrix;
α is a value between approximately 0.8 and approximately 1.0; and $$M = \alpha H + \alpha A + \frac{1-\alpha}{N} - 1;$$

and
calculating a maximal eigenvector d such that Md=d;
wherein eigenvector d comprises the user reputation scores.

16. A method for evaluating content items served by the system to multiple users who initiate sharing events regarding the content items, the method comprising:
receiving sharing event data reflecting the sharing events initiated by the multiple users, including, for each content item, an initial sharing event initiated by an initial user;
determining, with a processor and for each content item, a time-based order of the sharing events reflected in the sharing event data;
generating a graph based on the sharing event data, the graph comprising:
a separate node corresponding to each of the multiple users that initiated a sharing event; and
for each content item, for each given user that initiated a sharing event for the content item, other than the initial user who initiated the initial sharing event for the content item, at least one directed link from the given user's corresponding node to a node corresponding to another user who initiated a sharing event for the content item before the given user;
determining user reputation scores for the multiple users based on connectivity of the graph; and
for each content item, combining the user reputation scores of the users that initiated sharing events for the content item to produce a score for the item.

17. A non-transitory computer program product for evaluating content items served by the system to multiple users who initiate sharing events regarding the content items, the computer program product being embodied in a computer readable storage medium and comprising computer instructions for:
receiving sharing event data reflecting the sharing events initiated by the multiple users, including, for each content item, an initial sharing event initiated by an initial user;
determining, for each content item, a time-based order of the sharing events reflected in the sharing event data;
generating a graph based on the sharing event data, the graph comprising:
a separate node corresponding to each of the multiple users that initiated a sharing event; and
for each content item, for each given user that initiated a sharing event for the content item, other than the initial user who initiated the initial sharing event for the content item, at least one directed link from the given user's corresponding node to a node corresponding to another user who initiated a sharing event for the content item before the given user;
determining user reputation scores for the multiple users based on connectivity of the graph; and
for each content item, combining the user reputation scores of the users that initiated sharing events for the content item to produce a score for the item.

* * * * *